Sept. 11, 1934. E. N. JACOBI 1,973,170
DIE CAST THREADED OBJECT
Filed Jan. 8, 1934
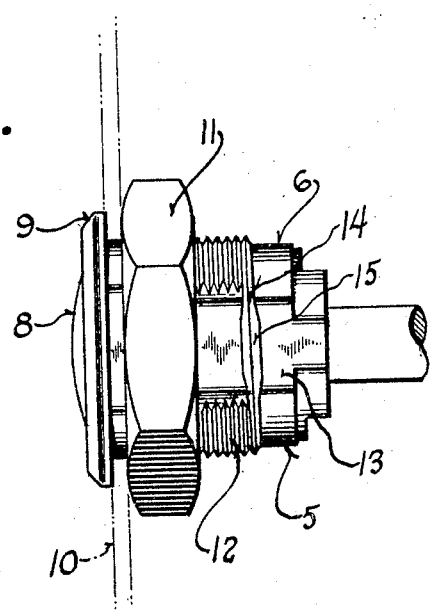
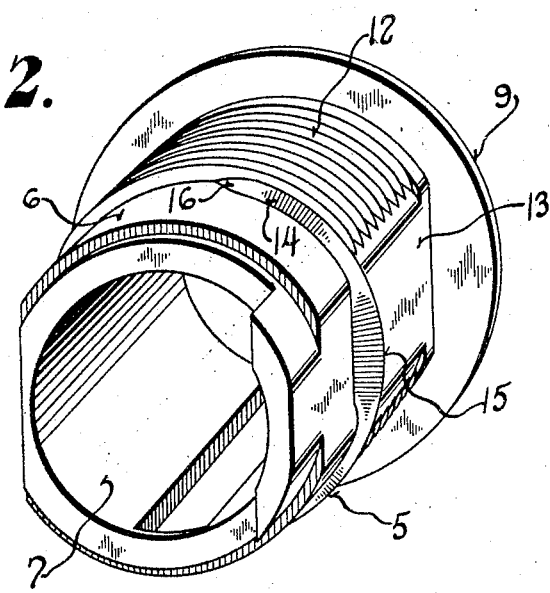
Inventor:
Edward N. Jacobi Patented Sept. 11, 1934

1,973,170

UNITED STATES PATENT OFFICE 1,973,170

DIE-CAST THREADED OBJECT

Edward N. Jacobi, Milwaukee, Wis., assignor to Briggs & Stratton Corporation, Milwaukee, Wis., a corporation of Delaware Application January 8, 1934, Serial No. 705,688

3 Claims. (Cl. 85—1)

This invention relates to improvements in die-cast threaded objects and refers more particularly to die-cast mounting members for cylinder locks.

Mounting members for cylinder locks generally comprise a cylindrical body bored to receive the lock cylinder and adapted to be mounted in an opening in a mounting panel. An enlarged annular flange on the front end of the cylindrical body limits inward movement thereof and affords a shoulder between which and a nut threaded on the cylindrical body, the panel is clamped.

The mounting members are die-cast complete with the threads and the split type of die is preferably employed. Consequently, there is apt to be a slight misalignment between the threads formed by one half of the die and those formed by the other half of the die. Where the threads are continued entirely about the cylindrical body, this slight misalignment forms abrupt shoulders at the line of part. These shoulders at the line of juncture between the two halves of the casting necessitate a loose fit of the nut on the mounting member, which is obviously objectionable.

To overcome this difficulty, it has been customary to cut away the opposite sides of the casting in line with the juncture between die sections so that the threads were not continued entirely about the cylindrical body. Consequently, in the event of misalignment between the threads of the two halves, the objectionable abrupt shoulders were not present and it was possible to properly fit the nut on the thread. But, while the provision of flat sides overcame the objectionable requirement for a loose fit, it resulted in another disadvantage arising from the fact that there were two starting points for the thread. Hence, unless extreme care was exercised in applying the nut, there was a strong probability that it would be started with the threads crossed.

This invention has as its object the provision of means to preclude this possibility of starting the nut in a "cocked" position, and contemplates as a further object, the provision of means for preventing improper starting of the nut while at the same time retaining the advantages of flattened sides in line with the juncture of the die sections.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawing, I have illustrated one complete example of the physical embodiment of my invention constructed according to the best modes I have so far devised for the practical application of the principles thereof, and in which:

Figure 1 is a side view of a conventional lock structure embodying this invention;

Figure 2 is an enlarged perspective view of a lock mounting member constructed in accordance with this invention.

Referring now more particularly to the accompanying drawing, the numeral 5 designates the mounting member of a conventional cylinder lock. The mounting member comprises a cylindrical body portion 6, bored as at 7 to receive a lock cylinder 8 and provided at its outer end with an annular flange 9. The cylindrical body 6 is adapted to be passed through an opening in a mounting panel 10, where it is held in place by a clamping nut 11 threaded on the cylindrical body.

The threads 12 on the body member 6 on which the nut 11 is threaded, extend from a point adjacent the flange 9 rearwardly to a point close to the rear end of the body.

At diametrically opposite sides and in line with the juncture between the two halves of the casting, the cylindrical body is slabbed off or flattened as at 13, so that any misalignment existing between the threads formed by one die section, and those formed by the other die section, will not form abrupt shoulders.

To preclude the possibility of starting the nut improperly, or in a "cocked" position, the rearmost thread 14 is continued across one of the flat sides 13, as at 15, thus locating the starting point 16 of the thread on a cylindrical portion of the body member.

The continuation of this single thread across one of the flat sides 13 precludes starting the nut at a point diametrically opposite the proper starting point, and thus obviates the possibility of starting the nut with its threads crossed. Any shoulder formed by possible misalignment between the die sections on the portion 15 of the single thread 14 obviously is not objectionable and does not necessitate a looser fit of the nut on the thread.

From the foregoing description taken in connection with the accompanying drawing, it will be readily apparent to those skilled in the art, that this invention affords novel means for insuring the proper application of a nut to any threaded member having flattened sides which cut off part of the thread.

What I claim as my invention is:

1. In an externally threaded cylindrical object having its threaded portion flattened at opposite sides whereby the threads are partially cut away, means to insure the proper application of a nut on the threads comprising, a continuation of the outermost thread across one of the flat sides.

2. In a die-cast mounting member for cylinder locks including an externally threaded portion having opposite flat sides which cut off part of the thread, means to insure proper application of a nut on the thread comprising a continuation of the outermost thread across one of the flat sides.

3. Means to insure the proper application of a nut on an externally threaded cylindrical member having opposite sides cut away whereby part of the thread is removed, comprising a continuation of an endmost thread across one of the cutaway portions.

EDWARD N. JACOBI.